UNITED STATES PATENT OFFICE 1,931,894

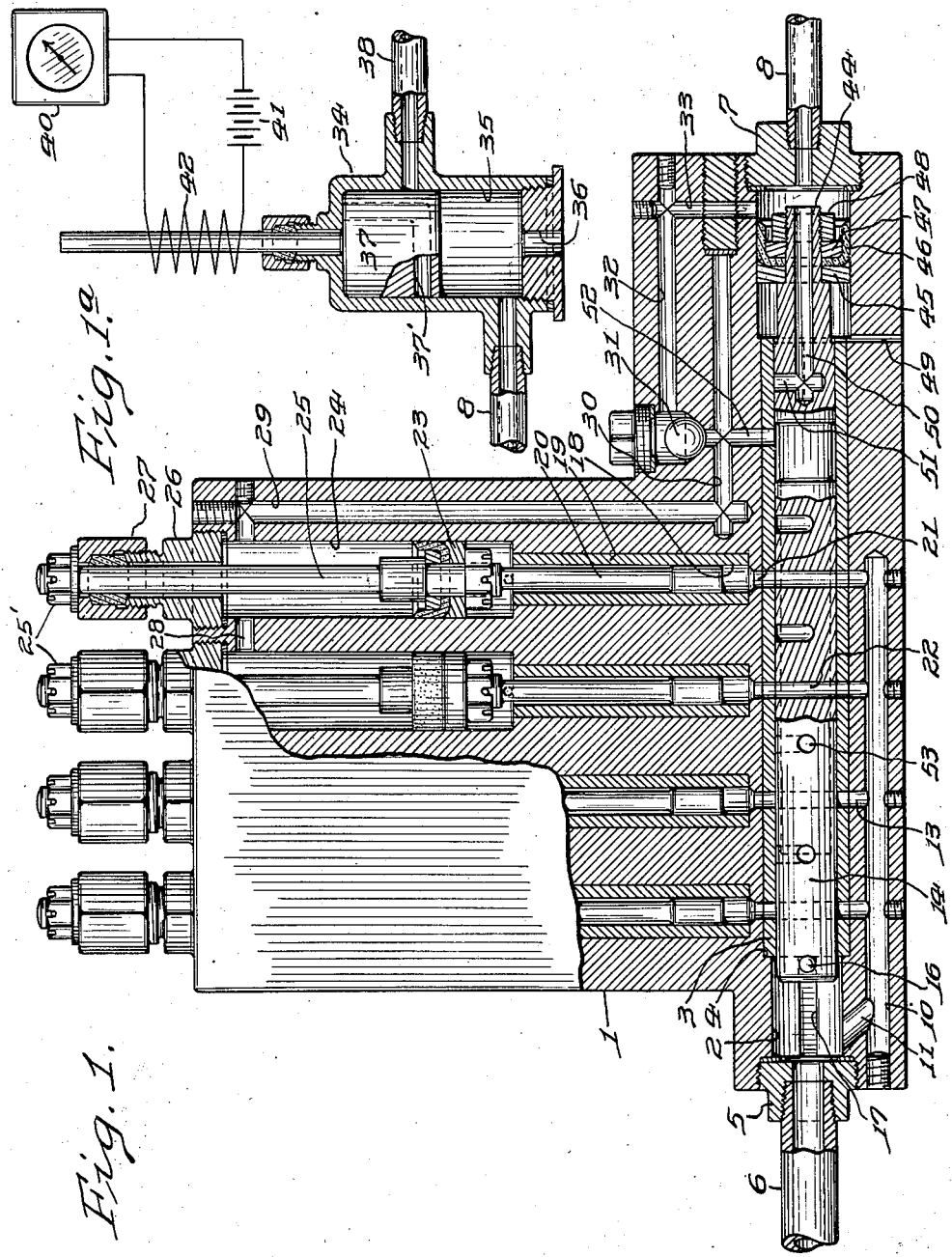

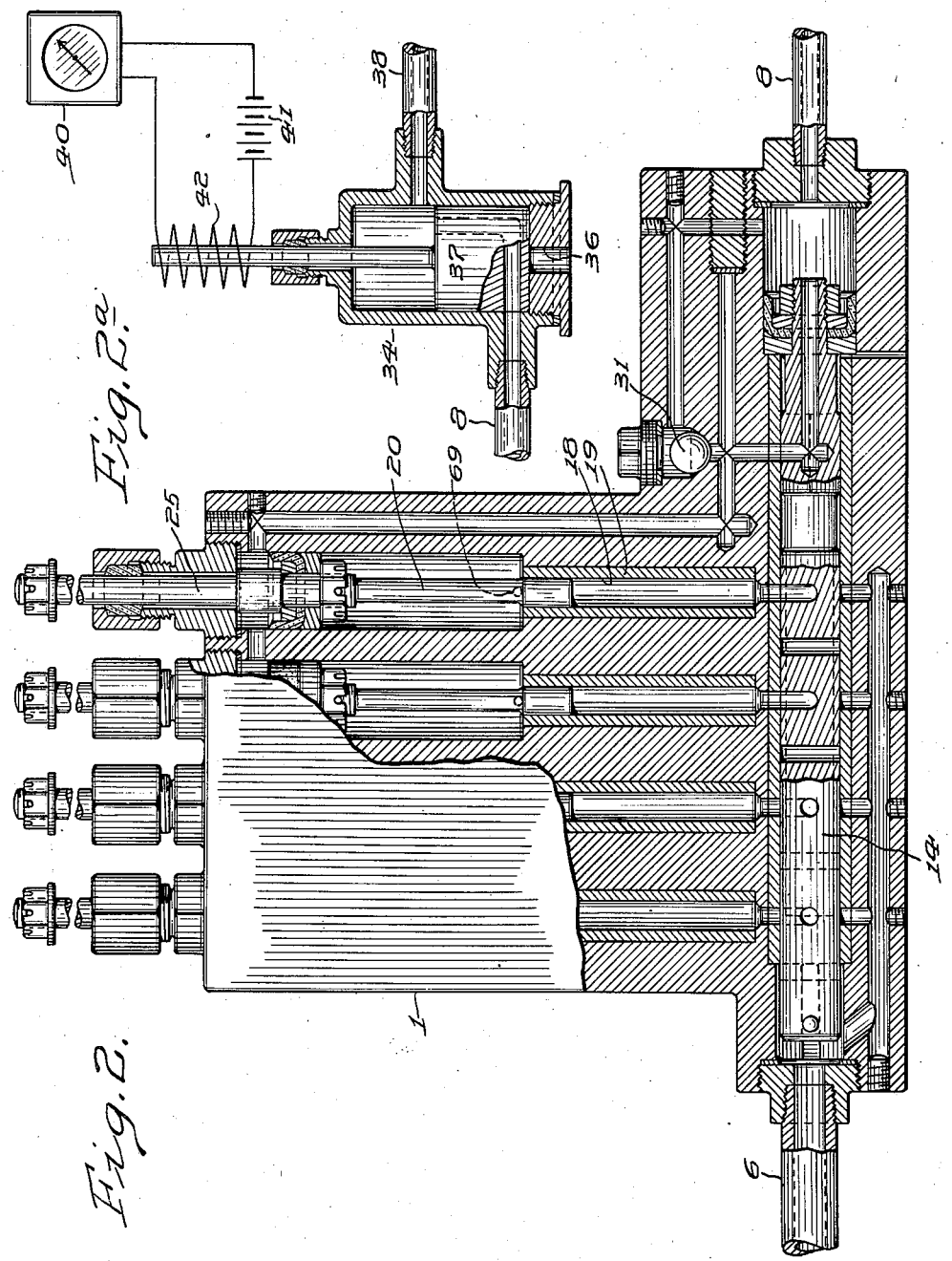

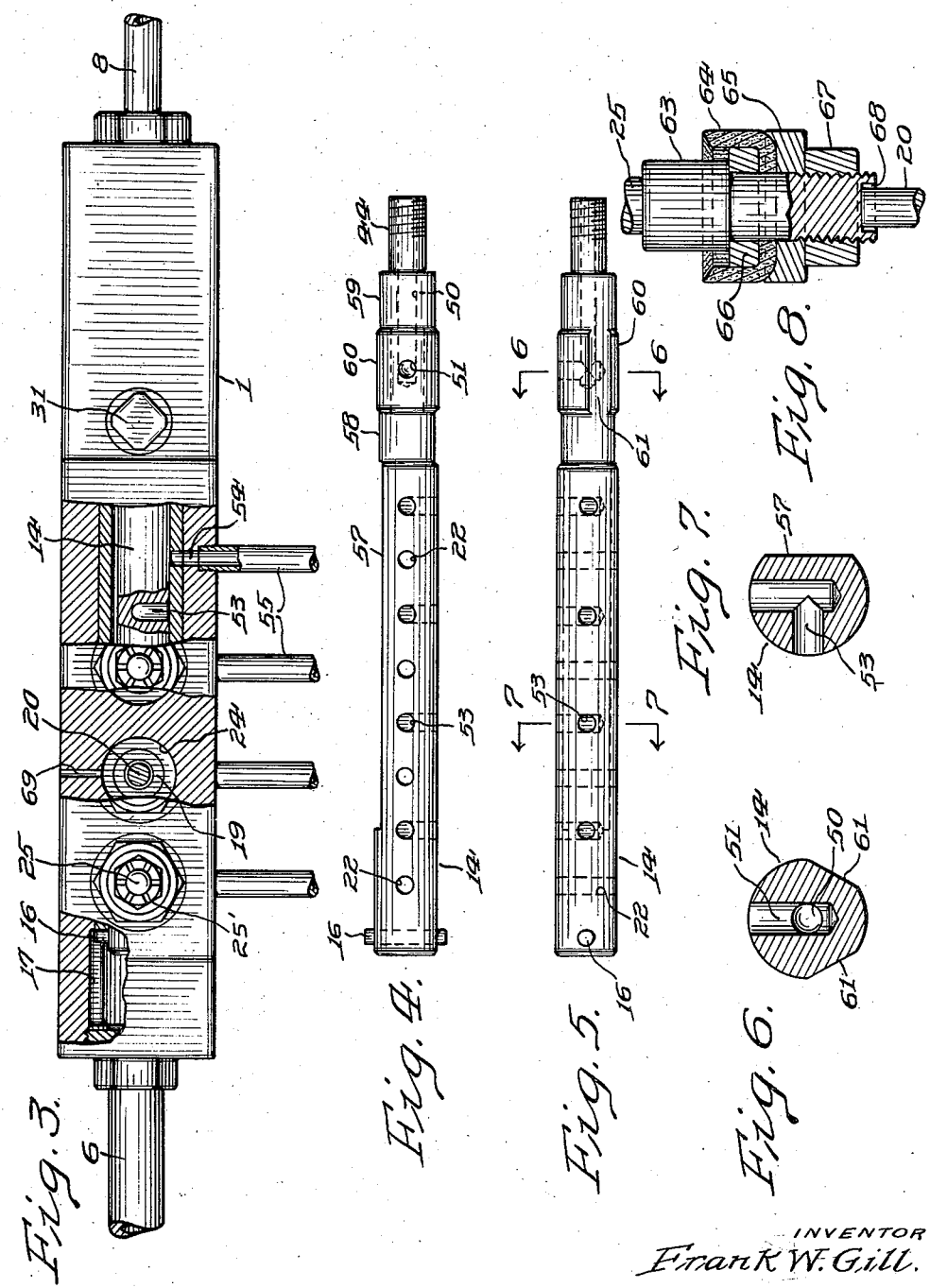

AUTOMATIC LUBRICATOR

Frank W. Gill, Youngstown, Ohio

Application April 7, 1931. Serial No. 528,319

17 Claims. (Cl. 184—29)

This invention relates to automatic lubricating devices and is more particularly directed to providing improved means for feeding a lubricant, such as grease, oil, or the like, to the bearings of motors, presses, and similar mechanical devices employed in plant operations.

It has heretofore been the practice in manufacturing plants, machine shops, and the like, where a plurality of mechanical devices are supplied with lubricant drawn from a common reservoir, to force the desired quantities of the lubricant to the bearings by means of a suitable pump mechanism so connected with the reservoir as to receive lubricant therefrom and adapted to deliver it under pressure to the bearings, the mechanism embodying, among other things, a plurality of spring pressed check valves serving the same purposes as the check valves in ordinary pumping systems.

Lubricating devices of this character are, however, frequently unsatisfactory, especially when heavy oil or grease is used, due to sticking of the check valves and their consequent failure to become properly seated under the influence of the springs provided for actuating them, with the result that the lubricant is frequently merely pumped back and forth between the pump cylinder and the reservoir instead of being properly delivered to the machine bearings and, so far as I am aware, no check valves now available are fully satisfactory to overcome this and other disadvantages incident to their use in lubricating devices of the general character to which I have referred.

A principal object of my invention, therefore, is to provide an improved lubricating device operative to receive lubricant from a reservoir and to force it into a plurality of feed lines respectively leading to the bearings of the machines which are to be lubricated, the lubricator embodying, among other things, means for positively insuring delivery of the lubricant to the feed lines when the pumping means is actuated.

A further object of my invention is to provide a lubricating device of the character described which is devoid of check valves or similar spring pressed elements in the lines traversed by the lubricant with consequent elimination of the difficulties incident to the operation of lubricators embodying such valves or elements.

A further object of my invention is to provide a fluid actuated lubricator adapted for automatic control by a suitable time switch, or other convenient means, in such manner that lubricant in measured quantities may be uniformly delivered to the machine bearings at desired intervals and which is so constructed as to avoid the possibility of the lubricant being merely pumped back and forth from the reservoir as above mentioned.

A still further object of my invention is to provide a lubricating device of such character that hardened steel sleeves may be employed to line the lubricant chambers and in which suitably machined parts may be arranged to operate with very slight clearances so as to prevent leakage and minimize wear, whereby the entire device may be maintained in satisfactorily operative condition throughout a relatively long period of useful life.

Other purposes, objects and advantages of my invention, as well as novel features of design, construction and arrangement comprehended thereby, will hereinafter be more particularly referred to or will appear from the following description of a prefered embodiment thereof in which reference will be had to the accompanying drawings.

In the said drawings, Fig. 1 is a front elevation partly broken away into vertical section of the said embodiment of my invention, showing the several parts thereof in the positions which they assume at the beginning of their operating cycle and preparatory to receiving grease, oil, or other lubricant from a reservoir (not shown); Fig. 2 is a similar view but showing the several moving parts in the positions which they occupy at the initiation of the operation of forcing grease into the several feed lines leading from the lubricator to the bearings which are to be lubricated; Fig. 3 is a top plan view of the lubricator shown in the preceding figures, certain portions being broken away in horizontal section on different planes to better show internal construction; Fig. 4 is a top plan view of the preferred form of control plunger employed in the lubricator; Fig. 5 is a side elevation thereof; Figs. 6 and 7 are enlarged transverse sections on the lines 6—6 and 7—7 respectively in Fig. 5. Fig. 8 is an enlarged fragmentary detail of one of the pump plunger connections and associated parts. Fig. 1ᵃ is a somewhat diagrammatic view partly in vertical section of one form of means for controlling the lubricator actuating fluid such as compressed air or the like, the air valve being shown in its normal position as when the parts of the lubricator proper are in the positions shown in Fig. 1; and Fig. 2ᵃ is a corresponding view of the said controlling means with the valve in the position assumed when the parts of the lubricator are in the positions shown in Fig. 2. In the several figures like characters are employed to designate the same parts.

Referring now more particularly to the drawings, I have shown and shall describe herein a lubricator comprising a battery of four lubricant pumping plungers and thus adapted to deliver the lubricant to four separate feed lines, but it will be understood that the lubricator may embody a greater or less number of plungers in accordance with the number of feed lines it is designed to serve. Thus, the lubricator illustrated in Figs. 1, 2 and 3 comprises a unitary housing 1 of suitable form, drilled and machined to provide a generally cylindrical longitudinal horizontal bore 2 in its lower portion into which a hardened steel sleeve 3 may be pressed or otherwise firmly seated, the left hand end of the bore, as viewed in Fig. 1, being slightly reduced to provide a shoulder 4 against which the adjacent end of the sleeve 3 may bear, while the opposite end of the bore is somewhat enlarged for a purpose which will hereinafter appear. The left hand extremity of the bore is threaded to receive a bushing 5 into which the lubricant supply pipe 6 is connected in the ordinary way, the pipe 6 being merely any convenient conduit adapted to conduct grease, oil or other lubricant from a suitable reservoir (not shown) in which the lubricant is maintained under sufficient pressure to force it into the lubricator. The opposite end of the bore 2 is similarly equipped with a bushing 7, to which a fluid feed line 8, leading from the controlling mechanism hereinafter more particularly described, conducts the actuating fluid, preferably compressed air.

Parallel to, but beneath the bore 2 I provide a smaller bore 10 interconnected with the left hand end of the bore 2 through an oblique passageway 11, and a plurality of longitudinally spaced vertical passages 13 are also extended upwardly from the bore 10 through the wall of the sleeve 3 for a purpose which will hereinafter appear. A substantially cylindrical control plunger 14 is slidably disposed in the sleeve 3 and is provided at one end with a transverse pin 16 adapted to engage slots 17 in the sides of the bore 2 whereby rotation of the plunger in the bore is prevented and its longitudinal movement to the right limited through engagement of the ends of the pin with sleeve 3.

Disposed above and extending vertically upward from the bore 2 I provide lubricant measuring cylinders 18 preferably having hardened steel liners 19 within which plungers 20 are arranged for vertical reciprocation, the sleeves, and the plungers at their enlarged lower ends, desirably being very accurately machined to form a snug sliding fit substantially impermeable to lubricant under relatively high pressures. The lower ends of the cylinders 18 communicate with the passage 10 through suitable intermediate passages or ports 21 extending through the wall of sleeve 3, vertical bores 22 in the plunger 14, and the passages 13, when the plunger 14 is in the position shown in Fig. 1.

In operative engagement with the upper ends of the several plungers 20, I provide air pistons generally designated as 23 which are slidable in suitable cylinders 24 coaxial with the cylinders 18 and are maintained in proper alignment by piston rods 25 extending through bushings 26 in the upper ends of the cylinders and packing glands 27 carried thereby. The cylinders 24 are interconnected adjacent their upper ends by a horizontal air passage 28 from which a vertical passage 29 leads to another horizontal passage 30 communicating through a check valve 31 and suitable passages 32 and 33 with the right hand end of the bore 2 and into which air from the cylinders 24 above the pistons 23 may thus escape as the latter move upwardly to the position shown in Fig. 2. Disposed at any convenient point adjacent the right hand end of the lubricator, I provide suitable means for controlling the actuating fluid supply, such as a common form of three-way air valve in the line 8, and I have therefore shown in Figs. 1a and 2a a conventional form of valve 34 having a chamber 35 open to the atmosphere through a bleeder hole 36, a piston 37 being slidably disposed within the chamber and provided with a passage 37' adapted to connect the airline 8 with a similar line 38 leading from a source of compressed air when the piston is in one position (Fig. 2a) and to cut off the air supply through the line 38 and permit air under pressure in the line 8 to be discharged into the atmosphere through the bleeder 36 when the piston is in another position (Fig. 1a).

Suitable controlling means such as the diagrammatically shown time controlled switch 40 connected through a source of current 41 with a solenoid 42, may be provided for periodically actuating the valve 34 but it will be understood that, if desired, other means for controlling the admission of compressed air to the lubricator, such as, for example, a mechanically operated trip arranged to actuate any suitable valve, may be employed, or the valve may be manually actuated, and thus that the specific controlling means herein shown forms no part of the present invention, while fluids other than compressed air may be employed.

The right hand end of the control plunger 14 projects somewhat beyond the end of the sleeve 3 and into the enlarged portion of the bore 2 and is provided with a threaded stud 44 of smaller diameter which receives a circular plate 45 against which a piston leather 46 is retained in position by a washer 47 and a nut 48, the piston leather being so arranged that when air is forced into the bore 2 through the air line 8, the plunger 14 will be moved to the left by the pressure of the air thereagainst, a bleeder hole 49 being provided to permit the escape of air behind the piston leather. Extending axially through this end of the control plunger for a short distance is an air passage 50 communicating with a similar vertical passage 51 which is moved into alignment with a passage 52 communicating with the passage 30 when the plunger is moved toward the left, while the control plunger 14 is provided with a plurality of longitudinally spaced right angled lubricant passages 53 which at the same time are respectively moved into alignment with the passages 21, thus interconnecting the latter with corresponding passages 54 extending horizontally outwardly in the housing and communicating with the bearing supply lines 55 through which the lubricant is discharged to the individual bearings.

I have thus far described my improved lubricator in somewhat general terms in order to explain broadly the general principles thereof and I shall now refer more particularly to certain structural details embodied in that form of the invention shown in the drawings and which I consider advantageous and desirable, although perhaps not absolutely necessary, since modified structures capable of performing the same purposes may readily be substituted therefor if preferred.

Thus, in Figs. 4 to 7, inclusive, I have shown detailed views of the control plunger 14 which I prefer to employ and which comprises a generally substantially cylindrical body of metal desirably accurately machined on its outer surfaces to fit snugly but slidably within the sleeve 3. The rear side of the plunger, considered in the position shown in Figs. 1, 2, and 5, may be flattened as at 57 in order to reduce the friction between the plunger and the sleeve, and the plunger may be made of reduced diameter at different places, for example, at 58 and 59 where no sealing effect is required, in order to further reduce the friction. Between the areas 58 and 59 is a machined portion 60 adapted to tightly fit the sleeve in order to insure a substantially non-leakable connection between the air passages 51 and 52, although this portion also may be flattened below its center as at 61 where a sealing effect is not required.

The pistons 23, one of which is shown in detail in Fig. 8, may each desirably comprise a short enlarged annular collar 63 on the rod 25 which also serves as a stop to limit the upward travel of the latter, and a piston leather 64 which is retained in place adjacent the lower end of the collar between a plate 65 and washer 66 by a nut 67 threaded onto the end of the rod. The bottom of the rod 25 is preferably provided with a socket 68 which loosely receives the upper end of the subjacent plunger 20 whereby the latter can readily align itself with the cylinder 18 and is thus prevented from binding in case the cylinders 24 and 18 are not bored in perfect axial alignment.

Referring now more particularly to the cycle of operation of the lubricator and assuming the various parts in the respective positions shown in Figs. 1 and 1a, grease or oil delivered under pressure through the pipe 6 first fills the passages 11, 10 and 13 and as the passages 22 are in alignment with the passages 13 and 21, the lubricant flows therethrough into the measuring cylinders 18, forcing the plungers 20 upwardly and filling the cylinders, the air from above the pistons 23 being discharged through the passages 28, 29 and 30, check valve 31, passages 32 and 33 into end of bore 2 and finally passing out of the lubricator through the pipe 8 and bleeder 36 in the air valve 34.

When the plungers 20 have reached the top of their travel, that is, the position shown in Fig. 2, the time switch 40 or other mechanism provided for the purpose is brought into play to actuate the air valve 34 so as to allow air under pressure to flow through pipe 8 into the lubricator. The check valve 31 prevents the flow of this air into the spaces above the pistons 24 through the passages 32 and 33 and the pressure of the air against the piston at the end of the plunger 14 therefore forces the latter to the left until the plate 45 is brought against the end of the sleeve 3, thereby aligning the right-angled lubricant passages 53 in the plunger with the passages 21 leading from the lubricant measuring cylinders 18 and with the passages 54 in the housing and also aligning the air passage 51 with the passage 52 so that the suitably compressed air can flow therethrough and through the passages 29 and 28 into the cylinders 24 above the pistons 23 thus forcing the latter and the plungers 20 downwardly, the bleeder holes 69 permitting the escape of air from beneath the pistons. As the passages 53 are now in alignment with the passages 21 and 54, the downward travel of the pistons 20 forces the lubricant from the cylinders 18 into the pipes 55 and thence to the bearings to which they respectively extend. When the plungers 20 have reached the bottom of their travel the air valve 34 is again actuated by the time switch 40 through the solenoid 42 to cut off the flow of air to the lubricator and to exhaust the compressed air retained therein through the bleeder 36 thereby permitting the pressure of the lubricant entering through the pipe 6 to return the plunger 14 to the position shown in Fig. 1 and placing the lubricator in condition to begin another cycle of operations.

It is apparent that the plungers 20 cannot be forced downwardly under normal conditions except when the plunger 14 is in the position shown in Fig. 2, so that a positive feed of the lubricant to the bearings is assured and the returning of the grease to the reservoir by actuation of the plungers is prevented. Additionally, as the piston rods 25 extend upwardly above the lubricator an observer is enabled to determine at a glance whether or not the lubricator is operating by merely noting the position and motion, if any, of the ends of the rods, while by adjusting the nuts 25' on the upper ends of the rods 25 the stroke of the rods may be varied with corresponding variation of the effective capacity of the cylinders 18 and, in turn, of the quantity of lubricant discharged from each cylinder on the downward movement of its piston.

Furthermore, inasmuch as the sleeves or liners 3 and 19 may be made of hardened steel and pressed into the housing after they have been accurately machined, the plungers 14 and 20, respectively, adapted to slide within these sleeves, may also be accurately machined to fit the latter sufficiently snugly to prevent leakage yet without causing an undue amount of wear, so that my improved lubricator may be employed satisfactorily for its intended purposes for a very long period of time without requiring repair or replacement of its parts, while the elimination of spring pressed valves in the lubricant supply passages avoids the disadvantages inherent in lubricators embodying such valves and negatives the possibility of unsatisfactory operation because of their sticking or failure to properly seat.

While under most conditions it will generally be preferred to arrange all of the cylinders 18 and 24 in the same vertical plane in the manner illustrated in the drawngs, the particular number of cylinders provided being ordinarily determined by the number of feed lines which the lubricator is intended to serve, such an arrangement, when a relatively large number of cylinders are employed, necessarily increases the length of the lubricator to a point which may make it inconvenient for installation. Under such circumstances the length of the lubricator may be correspondingly shortened by locating the cylinders in parallel planes in a single housing and utilizing a control plunger for each set thereof.

While I have herein illustrated and described one form of my invention with considerable particularity, I do not thereby desire or intend to confine myself specifically to any precise details in the design, construction, and arrangement of the various elements as the same are capable of modification in numerous particulars without departing from the principles of the invention.

Having thus described my invention, I claim and desire to protect by Letters Patent of the United States:

1. A lubricator of the class described, comprising a unitary housing having a longitudinally extending chamber and a cylinder, a hollow liner disposed in the chamber, a hollow liner disposed in the cylinder, a plunger slidable in the liner in the chamber, and a plunger slidable in the liner in the cylinder, said first mentioned plunger having a passage adapted to align with the cylinder when the plunger is in one position and another passage similarly adapted to align therewith when the plunger is in another position, and means for admitting an actuating fluid to the chamber to move the plunger from one position to another.

2. In a lubricator of the class described, a unitary housing comprising a longitudinally extending chamber, a cylinder, and another cylinder of greater diameter coaxial with and extending from that end of the first cylinder remote from the chamber, a sleeve disposed in the chamber, a sleeve disposed in the first cylinder, a piston in the second cylinder, a plunger slidable in the sleeve in the first cylinder adapted for actuation by the piston, a plunger slidable in the sleeve in the chamber provided with passages respectively adapted to align with the cylinder when the plunger is in different positions, and means for admitting an actuating fluid to the chamber to move the plunger from one of said positions to another.

3. In a lubricator of the class described, a unitary housing having a longitudinally extending chamber, a cylinder extending normal thereto, fluid pressure responsive means movable therein, a passage leading from the end of the cylinder remote from the chamber provided with branches respectively terminating in the chamber at spaced points, a plunger slidable in the chamber and provided with a passage adapted when the plunger is in one postion to establish communicaton between the chamber and one of said branch passages, and means for admitting a fluid under pressure to the chamber to move said plunger to a position in which said communication will be established.

4. In a lubricator of the class described, a unitary housing having a longitudinally extending chamber, a cylinder extending normal thereto, fluid pressure responsive means movable therein, a passage leading from the end of the cylinder remote from the chamber provided with branches respectively terminating in the chamber at spaced points, a check valve disposed in one of said branches, a plunger slidable in the chamber and provided with a passage adapted when the plunger is in one position to establish communication between the chamber and one of said branch passages, and means for admitting a fluid under pressure to the chamber to move said plunger to a position in which said communication will be established, said check valve closing the other branch passage to the flow of said fluid therethrough and thence to the cylinder.

5. In a lubricator of the class described, a unitary housing having a longitudinally extending chamber, a cylinder, a passage leading from one end of the cylinder and branch passages leading therefrom and terminating in the chamber at longitudinally spaced points, a piston slidable in the cylinder, a plunger slidable in the chamber and provided with a piston disposed between the terminations of said branch passages, said plunger having a passage adapted when the plunger is at one end of its travel to establish communication between one of said branch passages and the chamber, and means for admitting fluid under pressure to the chamber behind the plunger piston.

6. In a lubricator of the class described, a unitary housing having a longitudinally extending chamber, a cylinder, a passage leading from one end of the cylinder and branch passages leading therefrom and terminating in the chamber at longitudinally spaced points, a piston slidable in the cylinder, a plunger slidable in the chamber and provided with a piston disposed between the terminations of said branch passages, said plunger having a passage adapted when the plunger is at one end of its travel to establish communication between one of said branch passages and the chamber, means for admitting fluid under pressure to the chamber behind the plunger piston, and a check valve in the other branch passage operative to close it against the passage of said fluid therethrough and into the passage leading to the cylinder and to open said branch passage to a flow of fluid therethrough from the cylinder in the opposite direction.

7. A lubricator of the class described comprising a housing having a chamber and a second chamber communicating therewith, a valve plunger axially slidable in the first chamber and having a passage adapted to communicate with the second chamber when the plunger is in one position and another passage adapted to communicate therewith when the plunger is in another position, a plunger slidable in the second chamber, a source of fluid under pressure and means for admitting said fluid to each of said chambers to thereby successively move said plungers respectively from one position to another.

8. A lubricator of the class described, comprising a housing having a chamber and a second chamber communicating therewith, a valve plunger slidable in the first chamber and having a passage adapted to align with the second chamber when the plunger is in one position and another passage similarly adapted to align therewith when the plunger is in another position, a plunger slidable in the second chamber, means for admitting an actuating fluid under pressure to the first chamber to thereby move said valve plunger from the first of said positions to the second and means for directing a portion of said fluid into the second chamber to then move the plunger therein in a predetermined direction.

9. A lubricator of the class described, comprising a housing having a chamber and a cylinder communicating therewith, a valve plunger slidable in the chamber and having a passage adapted to align with the cylinder when the plunger is in one position and another passage similarly adapted to align therewith when the plunger is in another position, a plunger slidable in the cylinder, means for continuously supplying lubricant under pressure to one end of said chamber and means for intermittently admitting an actuating fluid to the opposite end of the chamber to thereby move the valve plunger from the first of its said positions to the second and to then move the plunger in the cylinder in a predetermined direction, the pressure of the lubricant operating to consecutively move both plungers respectively in the opposite directions upon relief of the fluid pressure in the chamber.

10. A lubricator of the class described, comprising a housing provided with a chamber, a cylinder communicating therewith, a lubricant outlet passage extending from the chamber adapted for connection to a feed line and a lubricant inlet passage extending from adjacent one end of the chamber to a point in the latter remote from said end, a plunger axially slidable in the chamber, a piston carried thereby adjacent the other end of the chamber, said plunger having a passage adapted to establish communication between the cylinder and the inlet passage when the plunger is in one position and a passage adapted to establish communication between the cylinder and the outlet passage when the plunger is in another position, means operative to force lubricant from the cylinder through said last mentioned passage when the plunger is in the latter position, and means for admitting an actuating fluid to that end of the chamber behind the plunger piston to move the plunger from one of said positions to the other.

11. A lubricator of the class described, comprising a housing provided with a chamber, a cylinder communicating therewith, a second cylinder, a lubricant outlet passage extending from the chamber and adapted for connection to a feed line, a lubricant inlet passage extending from adjacent one end of the chamber to and terminating in a point in the latter remote therefrom, and an actuating fluid passage terminating at one end in the chamber and at its other in the second cylinder, a plunger in the first cylinder, a piston in the second cylinder operable to move said plunger in one direction, a plunger axially slidable in the chamber having passages respectively adapted to establish communication between the first cylinder and the inlet passage when the plunger is in one position, and between said cylinder and the outlet passage when the plunger is in another position, and a third passage adapted to establish communication between one end of the chamber and the actuating fluid passage when said plunger is in the latter position, a piston carried by said plunger, and means for admitting an actuating fluid to the chamber to move said plunger from one of said positions to the other and to then actuate the first mentioned piston through the medium of a portion of said admitted fluid passing through the actuating fluid passage to the second cylinder.

12. A lubricator of the class described, comprising a housing having a longitudinally extending chamber, a cylinder extending angularly thereto and interconnected therewith, a lubricant inlet passage extending from one end of the chamber to another point therein, a lubricant outlet passage extending from the chamber and adapted for connection to a feed line, an actuating fluid passage having branch passages respectively communicating with the chamber at spaced points, a plunger in the cylinder, fluid actuated means operable to move the plunger in one direction, a plunger slidable in the chamber, a piston carried thereby, and means for admitting a fluid under pressure to the chamber behind said piston, said plunger having a passage adapted to communicate with one of said branch passages when the plunger is in a predetermined position in the chamber to thereby admit said fluid to said fluid actuated means, another passage adapted to establish communication between the cylinder and the outlet passage when the plunger is in said position in the chamber, and a third passage adapted to establish communication between the cylinder and the inlet passage when the plunger is in another position in the chamber.

13. A lubricator of the class described, comprising a housing having a longitudinally extending chamber, a cylinder extending angularly thereto, a lubricant inlet passage extending from one end of the chamber to another point therein, a port connecting the cylinder and the chamber, a lubricant outlet passage extending from the chamber adapted for connection with a feed line, an actuating fluid passage having branch passages respectively communicating with the chamber at spaced points, a plunger in the cylinder, fluid actuated means operable to move the plunger in one direction, said fluid passage being arranged to convey fluid to said fluid actuated means, a plunger slidable in the chamber, a piston carried thereby, means for preventing axial rotation of said plunger, and means for admitting fluid under pressure to the chamber behind said piston, said last mentioned plunger having a passage adapted to communicate with one of said branch passages when the plunger is in a predetermined position to thereby admit said fluid from behind said piston to said fluid actuated means to move the plunger in the cylinder, a passage operative to establish communication between said port and the lubricant outlet passage when the plunger is in said position, and another passage operative to establish communication between said port and the lubricant inlet passage when the plunger is in another position.

14. A lubricator of the class described, comprising a housing having a longitudinally extending chamber, a cylinder extending angularly thereto interconnected therewith, a lubricant inlet passage extending from one end of the chamber to another point therein, a lubricant outlet passage extending from the chamber and adapted for connection with a feed line, an actuating fluid passage having branch passages respectively communicating with the chamber at spaced points, a check valve in one of said branch passages, a plunger in the cylinder, fluid actuated means operable to move said plunger, said fluid passage being arranged to convey fluid to said fluid actuated means, a plunger slidable in the chamber, a piston carried thereby and disposed between the terminations of said branch passages, and means for admitting a fluid under pressure to the chamber behind said piston to move the plunger therein in one direction, said plunger having a passage adapted to register with one of said branch passages when said plunger is in a predetermined position in the chamber to thereby admit said fluid from behind said piston to the fluid actuated means through the fluid passage to thereby move the plunger in the cylinder, and other passages respectively adapted to establish communication between the cylinder and the lubricant outlet passage when said plunger is in said position, and between the cylinder and the lubricant inlet passage when said plunger is in another position.

15. In a lubricator of the class described, a housing having a longitudinally extending chamber adapted to receive lubricant at one end, a cylinder extending at an angle to said chamber and interconnected therewith, an inlet passage adapted to conduct lubricant from one end of the chamber to a point therein in substantial alignment with the cylinder, a lubricant outlet passage leading from the chamber adapted for connection to a feed line and an actuating fluid passage provided with branches respectively terminating in the chamber at longitudinally spaced points, a plunger slidable in the chamber having three passages respectively adapted to establish communication between the cylinder and the lubricant inlet passage when the plunger is in one position, and between the cylinder and the lubricant outlet passage, and between one of said branch passages and the chamber when the plunger is in another position, and means adapted for actuation by fluid directed thereto through said actuating fluid passage from said branch passage for forcing lubricant from the cylinder when the plunger is in the latter position.

16. In a lubricator of the class described, a housing having a longitudinally extending chamber adapted to receive lubricant at one end, axially aligned cylinders extending at an angle to said chamber, the cylinder adjacent thereto being interconnected therewith, an inlet passage adapted to conduct lubricant from one end of the chamber to a point therein in substantial alignment with the cylinders, a lubricant outlet passage leading from the chamber and adapted for connection to a feed line, and an actuating fluid passage leading from the cylinder remote from the chamber and provided with branches respectively terminating in the chamber at longitudinally spaced points, a plunger slidable in the chamber and carrying a piston adjacent the other end thereof, means for admitting an actuating fluid behind said piston to move the plunger in one direction, said plunger having passages respectively adapted to establish communication between the cylinder adjacent the chamber and the lubricant inlet passage when the plunger is in one position, and to establish communication between said cylinder and the lubricant outlet passage, and between that end of the chamber behind the piston and one of said branch passages when the plunger has been moved to another positon by admission of the actuating fluid to the chamber, and means operable by fluid directed to the cylinder remote from the chamber through said actuating fluid passage from said branch passage for forcing lubricant from the other cylinder through one of the passages in the plunger into the lubricant outlet passage when the plunger is in the latter position.

17. In a lubricator of the class described, a housing having a longitudinally extending chamber adapted to receive lubricant at one end, a lubricant cylinder interconnected therewith and extending at an angle thereto, a fluid cylinder axially aligned with the first cylinder, an inlet passage adapted to conduct lubricant from one end of the chamber to a point therein in substantial alignment with the cylinders, a lubricant outlet passage leading from the chamber adapted for connection to a feed line and an actuating fluid passage extending from the fluid cylinder provided with branches respectively terminating in the chamber at longitudinally spaced points, a plunger slidable in the chamber, means for preventing axial rotation of the plunger, a piston carried by the plunger and disposed in the chamber between the terminations of said branch passages therein, means for admitting actuating fluid to the chamber behind said piston, a plunger in the lubricant cylinder, a piston in the fluid cylinder operable to move said plunger in one direction, the plunger in the chamber having a passage adapted to establish communication between the lubricant cylinder and the inlet passage when said plunger is at one end of its stroke, another passage adapted to establish communication between said cylinder and the outlet passage when said plunger is at the other end of its stroke, and a third passage adapted to establish communication between that end of the chamber at which the actuating fluid is admitted and one of said branch passages when the plunger is in the latter position to thereby admit some of said fluid through the actuating fluid passage to the fluid cylinder to move the piston therein and, in turn, the plunger in the lubricant cylinder.

FRANK W. GILL.